Patented Sept. 10, 1935

2,013,722

UNITED STATES PATENT OFFICE 2,013,722

MANUFACTURE OF TERTIARY-BUTYL-CHLORIDE

Walter V. Wirth, Woodstown, N. J., assignor to E. I. du Pont de Nemours & Company, Wilmington, Del., a corporation of Delaware No Drawing. Application March 6, 1934,
Serial No. 714,265

1 Claim. (Cl. 260—162)

This invention relates to an improved process for the manufacture of tertiary-butyl-chloride.

It is an object of this invention to provide a process for the manufacture of tertiary-butyl-chloride in high yield and of sufficient purity to be usable directly in the synthesis of organic compounds by the Friedel-Crafts reaction. It is a further object of this invention to provide a process for the conversion of tertiary-butyl alcohol into tertiary-butyl-chloride, which is characterized by high efficiency and economy. Other and further important objects of this invention will appear as the description proceeds.

Tertiary-butyl-chloride has been prepared in the art by the action of concentrated hydrochloric acid upon tertiary-butyl alcohol. Hydrochloric acid of 38% strength (sp. gr. 1.19) was employed for this purpose in proportion of 3 moles of the acid to one mole of the alcohol. (Norris and Olmstead in "Organic Syntheses" Vol. VIII, p. 50). The yield was 78 to 88% of theory.

Other methods recorded in the art consisted of passing dry hydrogen chloride in excess into tertiary-butyl alcohol kept cold in a freezing mixture, and distilling a mixture of the alcohol and a large excess of concentrated hydrochloric acid. (Ibid.)

All these processes are characterized by using large excesses of concentrated, and therefore costly, hydrochloric acid, and the yields are generally not sufficiently high.

I have now found that less concentrated hydrochloric acid may be employed, and its proportion considerably reduced, if the reaction is carried out in the presence of an inorganic halide of the type which are known to promote reaction between ethyl alcohol and hydrochloric acid. Typical halides of this class are calcium chloride, magnesium chloride, zinc chloride and ferric chloride.

I have observed, moreover, that when such an agent or catalyst is employed, the yield of tertiary-butyl-chloride is appreciably raised, and the process in general becomes easier to handle, permits the use of simpler apparatus and results in high efficiency and economy throughout.

My preferred mode of procedure consists of intimately mixing tertiary-butyl alcohol with aqueous hydrochloric acid, for instance the commercial grade known as 20° Bé., and then adding a catalyst of the above class, preferably anhydrous calcium chloride. When the reaction is complete, the tertiary-butyl-chloride layer is separated from the aqueous solution of hydrogen chloride and the metal chloride, then dried. If desired, the tertiary-butyl-chloride may be given a final purification by fractional distillation.

Without limiting my invention to any particular procedure, the following examples are given to illustrate my preferred mode of operation. Parts given are by weight.

Example I

An enameled kettle, jacketed for the circulation of cooling water and also for heating with steam, was charged with 228 parts of hydrochloric acid of 32 per cent strength (2.0 mols). 74.1 parts (1.0 mol) of tertiary-butyl alcohol (freezing point 23°–25° C.) were then added with stirring, holding the temperature below 30° C. during the addition by circulating cooling water in the jacket, if required.

After all the alcohol was added, 50 parts of granulated anhydrous calcium chloride were added slowly over a period of about one hour, holding the temperature at 20–30° C. The mass was stirred for an additional hour, then allowed to settle. The bottom aqueous layer was separated and discarded. About 2 parts of anhydrous calcium chloride were added to the butyl-chloride layer, the mass stirred for a half hour, then settled for 2 hours. The clear tertiary-butyl-chloride was siphoned from the calcium chloride layer into suitable containers. The yield was exceptionally high, and the product was of sufficient purity to be used directly in Friedel-Crafts type condensations without further purification.

If desirable, the chloride may be subjected to fractional distillation, the pure chloride distilling at 50–52° C.

If the above process is repeated, using 456 parts of hydrochloric acid of 32 per cent strength (4.0 mols) but omitting the use of the inorganic assistant ($CaCl_2$), the yield is only 55 parts of chloride, which corresponds to 60 per cent of the theory from the alcohol.

Example II

The process is substantially as in Example I, except that in lieu of 2 mols of hydrochloric acid, one may use 1.2 to 1.5 mols. The results are substantially the same.

It will be understood that my preferred procedure above set forth is susceptible of wide variation without departing from the spirit of this invention.

Thus, instead of 74.1 parts of tertiary-butyl alcohol, a correspondingly increased proportion of the constant boiling mixture formed by this alcohol with water may be employed.

The ratio of hydrochloric acid to alcohol may be varied within wide limits. As shown by the above examples, 1 to 2 moles of hydrochloric acid per mole of tertiary-butyl-alcohol, produce good results. Higher ratios may be used, but the saving of HCl (which is one of the aims of this invention) is thereby diminished.

The strength of the hydrochloric acid employed may be varied over a wide range. The 32 per cent acid specified in Example I is the usual 20° Bé. acid of commerce. Weaker grades, however, may be used. In any event, the low concentration of the acid may be offset by the addition of more calcium chloride.

Instead of calcium chloride in the above example, other inorganic chlorides may be employed; for instance, zinc chloride, cadmium chloride, aluminum chloride, ferric chloride, etc. The selection of calcium chloride in the preferred procedure above set forth is based on its low cost as compared to other agents.

Instead of the inorganic chloride, the oxide or hydroxide of the corresponding metal may be used, allowing the requisite chloride to be formed in situ by the action of the hydrochloric acid in the reaction mass.

The quantity of catalyst may be varied within limits, as already noted. A good rule to follow is to use sufficient calcium chloride to give the resulting aqueous layer a sp. gr. of 1.270 to 1.275.

Other variations and modifications may be made in my preferred mode of procedure, as will be readily understood to those skilled in the art.

If the tertiary-butyl-chloride is to be used in processes where the presence of small quantities of dissolved hydrochloric acid is objectionable, the product may be washed with water and/or weak solutions of mild alkalies such as sodium bicarbonate to remove the acidity. The drying operation should, of course, be carried out subsequent to this washing process. Furthermore, as stated above, the material may be given a final purification by fractional distillation, if desirable.

It will be readily seen now that my process shows marked advantages over the prior art in that a material of excellent quality is obtained in unusually high yield, with a lower consumption of raw materials. Furthermore, the process may be carried out in simple equipment, and the operating steps are readily carried out with a small expenditure of labor, power, etc.

I claim:

A process for producing tertiary-butyl-chloride, which comprises reacting one mol of tertiary-butyl alcohol with from one to two mols of 18 to 20° Bé. hydrochloric acid, in the presence of about ½ mol of calcium chloride.

WALTER V. WIRTH.